Patented Sept. 17, 1929

1,728,735

UNITED STATES PATENT OFFICE

RICHARD RODRIAN, OF NEW YORK, N. Y.

WINNING OF METALS FROM METAL-BEARING MATERIALS

No Drawing.    Application filed June 22, 1927.   Serial No. 200,778.

My invention relates to the winning of metals from materials which contain them, such as ores and other metal bearing minerals, slags, etc., and the separation of the metals from the materials by treating the materials with a hot alkali sulphide solution.

The materials which contain the metals are treated with an alkali sulphide solution, such as a solution of sodium sulphide. Although the sulphide solution may be heated prior to treating the ores therewith and then merely added to the metal-bearing materials and permitted to act upon them, the preferred method is to treat the ores with the hot sulphide solution and then heat or boil the ores while in said sulphide solution. The metal contents of the treated material, if not already present in the form of metal sulphides, are changed into sulphides quite readily, and during the boiling, the metallic sluphides separate from the non-metal residue and dissolve or float in the hot alkali sulphide solution.

The objects of the invention are to obtain a more complete separation of the metals from their ores than has heretofore been obtained and to obtain the metals in the form of compounds which can readily be treated by subsequent processes to obtain the free metals, as such, for use in the arts.

Other and further objects and features of the invention will more fully appear from the following description and will be particularly pointed out in the claims.

The metal-bearing materials, such as ores, minerals, slags, residues, etc. are preferably very finely comminuted before treatment with the hot concentrated strongly alkaline sulphide solution of high specific gravity. It has been found, in the actual working of the process, that, if the materials are ground to a fineness of about 200 mesh, the physical and chemical reactions proceed quite readily.

The finely ground metal-bearing materials are placed in a vessel of a material, such as iron, which is not attacked by the hot alkali-sulphide solution and which will readily conduct heat. The previously heated alkali-sulphide solution is then added to the materials or the alkali-sulphide may, if desired, as will be described hereafter, be made in the vessel in which the reaction is to be carried out. In treating the metal-bearing materials directly with the alkali-sulphide solution, a concentrated solution of alkali-sulphide and water is prepared and heated, and it is then added to the finely ground metal-bearing materials in the vessel while the vessel is heated. In order to secure an even mixture of the ore with the sulphide solution, the ore is preferably stirred while the hot alkali-sulphide solution is added.

After the hot alkali-sulphide solution has been added to the ore, the mixture is boiled until the metals in the ore either form sulphides, which float in the liquid or on the surface thereof due to the specific gravity of the solution, or form soluble compounds with the alkali-sulphide solution and dissolve in it. The boiling agitates the solution and thus enables every particle of the metal-bearing material to be acted upon by the alkali-sulphide in the solution, and the heat promotes the chemical reaction between the alkali-sulphide and the material, with the consequent removal of all of the metals. If any of the metals which are present in the original material as sulphides and which would rise to the surface of the solution, happen to be held in the mass of material when it is first placed in the treating vessel, the boiling and consequent agitation of the mass gives these sulphides the opportunity to rise to the surface of the solution.

Instead of adding the hot alkali-sulphide solution to the finely divided ore, I may roast the ore with an alkali, such as soda ash or the corresponding potassium compound, or smelt the ore with a caustic alkali, such as sodium or potassium hydrate, and then add water, after the heated mass has cooled sufficiently so that there is no danger of a too violent reaction. I then add sulphur to the alkali solution and heat it to form the alkali-sulphide solution, and continue the heating of solution containing the ore, preferably bringing the solution to a boiling temperature and maintaining it there for an appreciable length of time, until the sulphides of the metals are formed and float in the liquid or on the surface thereof, or the metals react with the alkali-sulphide solution to form metallic compounds which are soluble in said solution. Whichever method is followed, the result is that the pulverized metal-bearing materials are treated with a concentrated alkali-sulphide solution of relatively high specific gravity, preferably hot and boiling, until metallic sulphides are formed which float in the liquid or on the surface thereof, or metallic compounds are formed which are soluble in the solution.

In some instances, particularly where the metal-bearing materials are loath to react with the hot concentrated alkali-sulphide solution, I may subject the materials to a preliminary electrolysis prior to the treatment with the hot alkali-sulphide. To give the metal-bearing materials this preliminary electrolysis, the pulverized materials are placed on the bottom of a metallic vessel, or container, or on a metal plate covering the bottom of a suitable non-metallic tank or container. If a metallic vessel, or container, is used, it is preferably made of iron or lead. If a non-metallic tank or container is used, the metal plate which covers the bottom is preferably a sheet of iron or a sheet lead plate.

If a metallic vessel or container is used, this acts as the cathode. If a non-metallic tank or container is used the metal plate covering the bottom thereof acts as the cathode and the leading-in wire, which conducts the electricity to the cathode, should be insulated from the electrolyte. This may conveniently be done by encasing the leading-in wire in a non-conducting tube which is not attacked by the electrolyte. The anode may be a lead or iron rod about 1/2 inch thick which dips slightly below the surface of the electrolyte. The electrolyte may be a rather dilute alkali solution such as a solution of sodium or potassium hydrate, or carbonate, in water.

This preliminary electrical treatment preferably continues for 48 hours, or more, depending upon the kind of ore. The electrolysis frees the metals, to a large extent, from the non-metallic material containing them and has the effect of making the metal-bearing materials respond more readily to the treatment with the hot alkali-sulphide solution. After the preliminary electrolysis is completed the electrolyte is removed from the solids which are then treated as above described with the hot concentrated alkali-sulphide solution.

The electrolysis of the metal-bearing materials, and their treatment with the hot concentrated alkali-sulphide solution, may be combined for the treatment of certain materials. For this purpose, the pulverized metal-bearing materials are placed in a vessel, of a material which is not attacked by the hot concentrated alkali-sulphide solution and which conducts electricity and which also easily conducts heat, such as iron. The concentrated alkali-sulphide solution, either hot or cold but preferably hot, is added to the materials in the vessel, while the contents are stirred to insure an even mixing of the alkali-sulphide solution with the materials. The vessel is then made the cathode, and an anode, of a material which easily conducts electricity and which is not appreciably attacked by the hot concentrated alkali-sulphide solution, such as iron or lead, is inserted a slight distance below the surface of the solution. The vessel is then heated to bring the solution to the boiling point and a current of electricity is passed from the anode to the cathode. The result of this treatment is that the solution is agitated by the boiling and the liberation of hydrogen on the cathode, and the metal-bearing materials are decomposed by the combined electrolysis and the action of the hot alkali-sulphide solution. This treatment is continued until the sulphides of the metals are formed and float in the liquid or on the surface thereof, or the metals react with the alkali-sulphide solution to form metallic compounds which are soluble in the solution.

When the metal-bearing materials have been boiled, or boiled and electrolyzed, in the alkali-sulphide solution for a sufficient length of time to form the sulphides or soluble metal compounds, the solution, with the floating metallic sulphides, is separated from the solid residues at the bottom of the vessel, which residues consist of the gangue, etc., and placed in a cooling vessel in which it is allowed to cool. As the solution cools, the metal sulphides settle to the bottom of the container. In order to hasten the settling of the sulphides in the cooling vessel, cold water, preferably in amount equal in volume to the volume of the solution, is added to the solution. The cold water both cools the solution and dilutes it to lower its specific gravity. This has the effect of causing the sulphides to immediately settle to the bottom of the cooling vessel. Also a cooling fluid, such as cold air or cold water may be directed against the sides of the vessel, or cooling coils may be inserted in the vessel in a well known manner.

In order further to hasten the settling of the sulphides and in order, also, to decompose the metal compounds which are dissolved in the alkali-sulphide solution and to cause the precipitation of the metals from the compounds thus decomposed, I may electrolyze the cooling or cooled alkali-sulphide solution. If the alkali-sulphide solution is to be electrolyzed, the cooling vessel is preferably of metal, or is provided with a metallic plate at its bottom which serves as a cathode, and an anode is inserted a short distance below the surface of the alkali-sulphide solution. Upon the passage of a current of electricity from the anode to the cathode, the deposition of the floating sulphides on the cathode is hastened, and also the soluble metal compounds are decomposed and the metals are deposited as sulphides on the cathode at or near the bottom of the vessel with some regeneration of the alkali-sulphide solution. For the regeneration of the alkali-sulphide solution, both the anode and cathode should be of materials which are unattacked by the particular alkali-sulphide solution used. For convenience, the cooling vessel may be made of iron or lead, in which case it will serve both as a cathode and a vessel through which the heat of the solution is readily dissipated. If the cooling vessel be of a material which is non-conducting to electricity, it is provided with a metallic cathode, which is preferably placed on the bottom of the vessel, and to which an insulated conducting wire conducts the electricity. The anode is preferably either of lead or iron, neither of which metals are readily attacked by the alkali-sulphide solution and both of which conduct electricity very well.

After the floating sulphides have settled to the bottom of the cooling vessel, either due to the cooling and dilution of the solution or the electrolysis, or both, and, if desired, the soluble metal compounds have been decomposed by the electrolysis, the solution is separated, preferably by filtering, from the solids. The solution may be concentrated by evaporation for further use in treating raw metal-bearing materials. The solids, which are composed of metals and metal sulphides, are washed and then treated to obtain the pure metals.

I have practiced the process, which is described in detail in the following paragraphs, and obtained an excellent recovery of metal values from the materials treated. The particular ores which were treated by this process were not extremely indifferent to reaction with the hot alkali-sulphide, and I therefore found it unnecessary, in order to obtain a complete recovery of all of the metals contained in the ore, to subject the ore, or the alkali-metal-sulphide solution, to an electrolytical treatment either before or after the treatment with the hot alkali-sulphide solution.

In treating this particular ore, 50 pounds of ore, finely pulverized to about 200 mesh, is placed in a 25 gallon iron kettle equipped for heating. To the ore is added 25 pounds of caustic soda and 2 gallons of water from the faucet. The ore, caustic soda, and water is thoroughly mixed and then heated for about 4 hours. After the heating, the mixture is permitted to cool and then 10 additional gallons of water, from the faucet, is added, together with 5 pounds of sulphur powder. The mixture is again heated to a boiling point for about 6 hours, during which the sulphur dissolves in the mixture forming a concentrated hot alkali-sulphide solution. The heat is then discontinued and the hot alkali-sulphide solution, with the floating metal sulphides, is removed, preferably by skimming and siphoning, from the non-metallic residues in the bottom of the kettle. The hot alkali-sulphide solution and the metallic sulphides are then placed in a cooling vessel to which 5 gallons of cold water are added with the result that the floating metal sulphides all settle to the bottom of the cooling vessel. After the solution has thoroughly cooled, the clear solution is siphoned from the deposited metal sulphides which are washed with hot water and filtered to remove the wash water. The clear alkali-sulphide solution is then returned to the kettle and boiled with the residue, for an additional number of hours which causes any of the metal sulphides which may have remained in the residues, to float. The heat is then discontinued and the alkali-sulphide solution containing the floating sulphides is removed. Cold water is added to settle the floating metal sulphides in this solution, after which the solution is removed from the sulphides which are then added to the metal sulphides originally obtained.

The above described process is given merely by way of example to illustrate the treatment of the particular ores from which the metals were to be recovered and is not to be considered as the only way in which the process may be carried out. I desire it to be distinctly understood that changes in the mode of procedure may be made without departing from the spirit of the invention, and that the invention is to be construed as broadly as the claims taken in conjunction with the prior art may allow.

I claim:

1. The process of obtaining metals from metal-bearing materials, which includes treating the materials with a hot alkali-sulphide solution of high specific gravity to remove the metals as chemical compounds from the non-metal residues, separating the hot alkali-sulphide solution containing the metals from the non-metal residues, allowing the alkali-metal-sulphide solution to cool, and recovering the metals from the solution.

2. The process of obtaining metals from metal-bearing materials, which includes treating the metals with a hot alkali-sulphide solution of high specific gravity to remove the metals as chemical compounds from the non-metal residues, separating the hot alkali-sulphide solution containing the metals from the non-metal residues, adding cold water to the hot alkali-metal-sulphide solution, and recovering the metals from the solution.

3. The process of obtaining metals from metal-bearing materials, which includes roasting the materials with an alkali, treating the roasted materials with a hot alkali-sulphide solution of high specific gravity to remove the metals as chemical compounds from the non-metal residues, separating the hot alkali-sulphide solution containing the metals from the non-metal residues, allowing the alkali-metal-sulphide solution to cool, and recovering the metals from the solution.

4. The process of obtaining metals from metal-bearing materials, which includes smelting the materials with an alkali hydrate, treating the smelted materials with a hot alkali-sulphide solution of high specific gravity to remove the metals as chemical compounds from the non-metal residues, separating the hot alkali-sulphide solution containing the metals from the non-metal residues, cooling the alkali-metal-sulphide solution, and recovering the metals from the solution.

5. The process of obtaining metals from metal-bearing materials, which includes smelting the materials with an alkali hydrate, adding water to the smelted alkali-hydrate-metal-bearing mixture, adding sulphur to said mixture, heating said mixture thereby to form a hot alkali-sulphide solution of high specific gravity and remove the metals as chemical compounds from the non-metal residues, separating the hot alkali-sulphide solution containing the metals from the non-metal residues, adding cold water to the hot alkali-sulphide solution, and recovering the metals from the solution.

6. The process of obtaining metals from metal-bearing materials which includes smelting the materials with an alkali-hydrate, adding water to the smelted alkali-hydrate, metal-bearing mixture, heating said mixture and during the heating adding alkali-sulphide solution to form a solution of high specific gravity to remove the metals as chemical compounds from the non-metal residues, separating the hot alkali-sulphide solution containing the metals from the non-metal residues, adding cold water to the hot alkali-sulphide solution and recovering the metals from the solution.

7. The process of obtaining metals from metal-bearing materials, which includes electrolyzing the materials in contact with a cathode, treating the electrolyzed materials with a hot alkali-sulphide solution to remove the metals as chemical compounds from the non-metal residues, separating the hot alkali-sulphide solution containing the metals from the non-metal residues, cooling the alkali-metal-sulphide solution, and recovering the metals from the solution.

8. The process of obtaining metals from metal-bearing materials, which includes electrolyzing the materials in contact with a cathode in an electrolyte of hot alkali-sulphide solution to remove the metals as chemical compounds from the non-metal residues, separating the hot alkali-sulphide solution containing the metals from the non-metal residues, allowing the alkali-metal-sulphide solution to cool, and recovering the metals from the solution.

9. The process of obtaining metals from metal-bearing materials, which includes treating the materials with hot alkali-sulphide solution of high specific gravity to remove the metals as chemical compounds from the non-metal residues, separating the hot alkali-sulphide solution containing the metals from the non-metal residues and electrolyzing the alkali-sulphide solution to recover the metals therefrom.

In testimony that I claim the foregoing, I have hereunto set my hand this 17th day of June, 1927.

RICHARD RODRIAN.